United States Patent
Hsiung et al.

[11] Patent Number: 6,106,790
[45] Date of Patent: Aug. 22, 2000

[54] ABATEMENT OF $NF_3$ USING SMALL PARTICLE FLUIDIZED BED

[75] Inventors: Thomas Hsiao-Ling Hsiung, Emmaus; Howard Paul Withers, Jr., Breinigsville, both of Pa.

[73] Assignee: Air Products and Chemicals, Inc., Allentown, Pa.

[21] Appl. No.: 08/914,085

[22] Filed: Aug. 18, 1997

[51] Int. Cl.[7] .................................................. B01D 53/54
[52] U.S. Cl. .................................... 423/239.1; 423/240 S
[58] Field of Search .................................. 423/489, 490, 423/239.1, 240 S

[56] References Cited

U.S. PATENT DOCUMENTS

| | | | |
|---|---|---|---|
| 4,493,797 | 1/1985 | Avedesian | 530/507 |
| 4,960,581 | 10/1990 | Harada et al. | 423/489 |
| 5,176,889 | 1/1993 | Yoshino et al. | 423/240 |
| 5,417,948 | 5/1995 | Iwata et al. | 423/239 |
| 5,728,642 | 3/1998 | Aritsuka et al. | 502/224 |

FOREIGN PATENT DOCUMENTS

| | | | |
|---|---|---|---|
| 333084 | 9/1989 | European Pat. Off. | 423/489 |
| 666101 | 8/1995 | European Pat. Off. | |
| 61-204025 | 9/1986 | Japan . | |
| 230731 | 7/1990 | Japan | B01D 153/34 |
| 5-023814 | 4/1993 | Japan . | |
| 6-099033 | 4/1994 | Japan . | |
| 6-134256 | 5/1994 | Japan . | |
| 71155542 | 6/1995 | Japan | B01D 53/34 |
| 7155540 | 6/1995 | Japan | B01D 53/68 |
| 7155541 | 6/1995 | Japan | B01D 53/68 |

OTHER PUBLICATIONS

Shen, et al., Nanosize Silicon Whiskers Produced by Chemical Vapor Deposition: Active Getter for NF3, Chemistry of Materials, (1995), vol. 7, pp. 961–968.

Vileno, et al., Thermal Decomposition of NF3 with Various Oxides, Chemistry of Materials, (1996) vol. 8, pp. 1217–1221.

Vileno, et al., Thermal Decomposition of NF3 by Ti, Si, and Sn Powders, Chemistry of Materials, (1995) vol. 7, pp. 683–687.

*Primary Examiner*—Steven P. Griffin
*Assistant Examiner*—Peter DiMauro
*Attorney, Agent, or Firm*—Geoffrey L. Chase

[57] ABSTRACT

A process for destroying $NF_3$ in a gas containing $NF_3$ by contacting the gas with a fluidized bed of metal particles capable of reacting with $NF_3$ wherein the metal particles have a particle size essentially no greater than approximately 300 microns. The process can be conducted in parallel connected switching fluidized beds wherein the beds are switched based upon achieving a predetermined bed height expansion based upon the reaction of the metal particles with the $NF_3$.

15 Claims, No Drawings

describes the use of various powders to abate $NF_3$. The powders included titanium, silicon and tin of 45 microns.

The prior art has attempted to provide various methods and means of abating $NF_3$. However, the prior art has not achieved a commercially viable process for $NF_3$ abatement which generates no pollutants, allows for high throughput, avoidance of clogging, efficient destruction of $NF_3$ and a method for recharging of the abatement system for continuous processing. These advantages are achieved by the present invention, as will be set forth in greater detail below.

ABATEMENT OF $NF_3$ USING SMALL PARTICLE FLUIDIZED BED

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Nitrogen trifluoride ($NF_3$) is generally used as a dry etching gas or a reactor chamber cleaning gas in the manufacture of semiconductors. The etching of silicon with an ionized reactive gas, such as $NF_3$, gives volatile reaction products. This is desirable because unlike earlier methods of etching in a fluorocarbon plasma, chances for fouling of wafer surfaces with reaction by-products, such as carbon and sulfur are eliminated, and accordingly the etching speed is expedited. For this reason, $NF_3$ gas is currently used more often, but since $NF_3$ is highly stable at ordinary temperatures, it is not decomposed in the atmosphere, and thus contributes to global warming of the environment. Moreover, although $NF_3$ is not flammable, $NF_3$ is toxic with a maximum allowable concentration of 10 parts per million. Therefore, disposal of waste $NF_3$ is desirable and has represented a problem for the semiconductor and industrial gas industries.

U.S. Pat. No. 5,417,948 discloses the use of zirconium alloys to abate $NF_3$. It lists fluidized beds as a possible means of contacting the alloys with $NF_3$. A control example used iron wire cut into 5 to 10 mm pieces as a bed material.

Japanese Patent Publication H7-155,542 discloses the use of chromium, manganese, iron, aluminum, cobalt, nickel, copper, zinc, palladium and tin to abate $NF_3$ at 150 to 500° C. with a surface area of 1 $m^2/g$ or greater.

U.S. Pat. No. 5,176,889 discloses the use of carbonaceous materials to convert $NF_3$ to $CF_4$ and nitrogen.

Japanese Patent Publication 2-30731 discloses the abatement of $NF_3$ using activated carbon and charcoal of 4 to 8 mesh (4.7 to 2.4 mm).

Japanese Patent Publication 07155,540 discloses the use of mixtures of metal fluorides and reduced metals including iron, aluminum, manganese and palladium, and fluorides of zirconium, sodium, zinc, aluminum and calcium to abate $NF_3$.

Japanese Patent Publication 07155,541 discloses the use of metal hydroxides and oxides to abate $NF_3$. Chromium, iron, zirconium, and manganese oxide and iron hydroxide are mentioned.

Shen, et. al., Nanosize Silicon Whiskers Produced by Chemical Vapor Deposition: Active Getter for $NF_3$, Chemistry of Materials, (1995), Vol. 7, pp. 961–968 describes the use of silicon whiskers of 120–300 Å (0.012 to 0.030 microns) to abate $NF_3$. The smaller diameter silicon whiskers were determined to be the most active $NF_3$ getters.

Vileno, et.al., Thermal Decomposition of $NF_3$ with Various Oxides, Chemistry of Materials, (1996) Vol. 8, pp. 1217–1221, describes the use of various oxides to abate $NF_3$. The oxides included aluminas, calcium oxides and zeolites.

Vileno, et.al., Thermal Decomposition of $NF_3$ by Ti, Si, and Sn Powders, Chemistry of Materials, (1995) Vol. 7, pp. 683–687, describes the use of various powders to abate $NF_3$. The powders included titanium, silicon and tin of 45 microns.

BRIEF SUMMARY OF THE INVENTION

The present invention is a process of destroying $NF_3$ in a gas containing $NF_3$ by contacting the gas with a fluidized bed of metal particles capable of reacting with $NF_3$ wherein the particles have a particle size essentially no greater than approximately 300 microns.

Preferably, up to 10 wt. % of the bed of metal particles are large particles having a particle size sufficiently larger than 300 microns to assist in mixing of the bed of metal particles.

Preferably, the large particles have a particle size of approximately 500 to 2000 microns.

Preferably, the metal particles are selected from the group consisting of iron, nickel, copper, calcium, aluminum, magnesium, manganese, cobalt, zinc, tin and mixtures thereof.

Preferably, the contacting is performed at a temperature in the range of 150 to 550° C.

Preferably, the gas is contacted with the fluidized bed until the height of the fluidized bed increases due to reaction with the $NF_3$ to a predetermined increased bed height.

Preferably, the gas alternately contacts one of at least two parallel switching fluidized beds where one bed is contacting the gas while one or more other fluidized beds are being recharged.

Preferably, the gas contact is switched from a first of at least two parallel switching fluidized beds to an other fluidized bed that has been recharged when the first bed has expanded to at least approximately 90 percent of the original bed height.

Preferably, after the gas contacts the fluidized bed the gas contains no greater than 10 parts per million by volume of $NF_3$.

Preferably, the flow of the gas is sufficient to obtain at least a minimum fluidization velocity of the fluidized bed for the metal particles contained in the fluidized bed.

Preferably, the gas has a residence time, defined by the ratio of packed bed volume to the volumetric feed flowrate at normal conditions, in the fluidized bed of greater than approximately 3 seconds.

Preferably, the gas is at superatmospheric pressure.

Preferably, the flow of the gas is approximately at least two times the minimum fluidization velocity.

Preferably, the gas contains a gas component selected from the group consisting essentially of $N_2$, $O_2$, $F_2$, $CF_4$, $C_2F_6$, $CHF_3$, $SF_6$ and mixtures thereof.

Most preferably, the present invention is a process of destroying $NF_3$ in a gas containing $NF_3$ and one or more gas components selected from the group consisting essentially of $N_2$, $O_2$, $F_2$, $CF_4$, $C_2F_6$, $CHF_3$, $SF_6$ and mixtures thereof by contacting said gas alternately with one of a pair of switching parallel connected fluidized beds of iron metal particles capable of reacting with $NF_3$ wherein the particles have a particle size essentially no greater than approximately 300 microns, and switching beds when the height of the bed being contacted with said gas increases to a predetermined bed height corresponding to substantially stoichiometric reaction of $NF_3$ with the iron metal particles.

Preferably, the iron metal particles are at least approximately 99% iron by weight.

Preferably, the iron metal particles have an average particle size of approximately 100 microns.

Preferably, the iron metal particles react with the $NF_3$ to generate $FeF_3$ and nitrogen.

In one preferred embodiment, the gas containing $NF_3$ contains predominately nitrogen and $NF_3$.

In an alternate embodiment, the metal particles are continuously being added to the fluidized bed and metal particles that have been reacted with the $NF_3$ are continuously being removed. In this alternate embodiment, preferably a single fluidized bed is utilized.

BRIEF DESCRIPTION OF THE SEVERAL VIEWS OF THE DRAWINGS

Not Applicable

DETAILED DESCRIPTION OF THE INVENTION

The present invention is a method of destroying $NF_3$ using fine metal powder in a fluidized bed reactor. The preferred metal powder is iron and should have a purity of greater than 90%, preferably 99% by weight and a particle size essentially no greater than approximately 300 microns, preferably an average particle size of approximately 100 microns. Preferably, up to 10 wt. % of the particles in the bed can be larger than 300 microns with sufficient size to assist in mixing of the particles of essentially no greater than approximately 300 microns during operation and fluidization to prevent caking of the latter particles. These larger particles could preferably have a size of 500 to 2000 microns.

The preferred operating conditions are:

temperature; 150° C. to 550° C.;

pressure; greater than atmospheric pressure;

feed flow; greater than the minimum fluidization velocity of the powder;

residence time; greater than 3 seconds.

Other metals such as Ni, Cu, Ca, Al, Mg, Mn, Co, Zn and Sn that can form non-volatile metal fluorides will also be good candidates. The reaction conditions, however, will vary depending on the metal of choice.

This invention can be used in a process to selectively destroy $NF_3$ in a semiconductor exhaust stream to recover one or more of $N_2$, $CF_4$, $CHF_3$, $SF_6$ and $C_2F_6$. Operation conditions can be such chosen only to destroy $NF_3$ and leave one or more of $N_2$, $CF_4$, $CHF_3$, $SF_6$ and $C_2F_6$ untouched for recovery. The gas can also contain $O_2$ and $F_2$, but these gas components will compete with $NF_3$ for the metal particles and will be removed from the $NF_3$-depleted product gas stream.

The objective of this invention is to provide a cost-effective method of destroying nitrogen trifluoride, $NF_3$. $NF_3$ is a toxic chemical with a threshhold limit value (TLV) of 10 ppm. It is also a known global warming gas and has a relatively long lifetime in the atmosphere. $NF_3$ is sparingly soluble in water and rather stable at room temperature with little reactivity with an acid or an alkali. Hence, the destruction of $NF_3$ is difficult. $NF_3$ can be incinerated in air, but it requires high temperatures and the combustion process generates other pollutants, such as various nitrogen oxides, $NO_x$. Wet scrubbing with acid or caustic solution is not effective. This method provides a simple alternative to destroy $NF_3$ while producing no hazardous waste.

A further objective of this invention is to selectively destroy $NF_3$ in the presence of other fluorinated compounds (FCs). The primary use of $NF_3$ is in the semiconductor industry to clean chemical vapor deposition (CVD) reactor chambers and etch metal layers on a semiconductor microchip. Other FCs, such as $CF_4$, $C_2F_6$, $CHF_3$ and $SF_6$ are used in the semiconductor fabs for similar purposes. However, their consumption in the manufacturing processes is usually not complete, and the exhaust stream will contain a mixture of FCs with the bulk gas being the diluting nitrogen. Such an exhaust stream needs to be treated before venting into the atmosphere. The semiconductor industry prefers the option of reclaiming and recycling the FCs for reuse. Because of close similarity of physical properties of $NF_3$ and $CF_4$, separation of these two components will be very difficult and costly. Selective destruction of $NF_3$ becomes a logical alternative.

The present invention suggests a method of destroying $NF_3$ in a fluidized bed of preferably fine iron powder. More specifically, a powder with high purity (>99 wt. %) prepared, for example, electrolytically with a particle size of essentially no greater than approximately 300 microns can be used for this application. The high purity iron powder, which is commercially available at a reasonable cost, minimizes the generation of other impurities. The small particle size provides adequate fluidization of the iron-bed and rate of reaction between the iron and $NF_3$.

The presumed reactions between Fe and $NF_3$ are:

$$2\ Fe + 2\ NF_3 \rightarrow 2\ FeF_3 + N_2 \qquad (1)$$

$$3\ Fe + 2\ NF_3 \rightarrow 3\ FeF_2 + N_2 \qquad (2)$$

Theoretically, each mole of Fe (56 grams) is capable of removing 71 grams of $NF_3$. The products are $FeF_3$ and $N_2$. No $NO_x$ is formed. Other metals, such as Ni, Cu, Ca, Al, Mg, Mn, Co, Zn and Sn and their alloys that can form nonvolatile metal fluorides, will also be good candidates. In addition, minerals containing these metals may be used for this application. The reaction conditions, however, will vary depending on the metal of choice.

Operating conditions will depend on feed composition and flowrate. The fresh iron powder can start to react with $NF_3$ at a temperature as low as 150° C. The method works practically under any operating pressure. Conveniently, an exit pressure close to the atmosphere will be adequate. Depending on the feed concentration, operating pressure and residence time, the reactor temperature can be chosen to remove $NF_3$ completely. The velocity flowing through the reactor should be high enough to fluidize the solid powder. The fluidization velocity can be measured by plotting pressure drop across the bed versus flow as described in "Fluidization Engineering" by Kunii and Levenspiel and published by John Wiley in 1969. When a significant drop-off in the rate of pressure drop increase for increasing flow of fluidization gas is measured, fluidization has occurred. Fluidization as used herein includes percolation or ebulation as those terms are understood in the art. The fluidization should be sufficient to elevate the particles initially without having them removed from the bed initially so that an internal circulation of the particle is created with the particles rising and falling due to proximity to the fluidizing gas. The bed of particles that are being fluidized would take on the properties of a fluid, or near fluid if they are merely being percolated. Preferred fluidization rates are from 2 to 10 times the minimum fluidization rate for the metal particles. Continuous operation could be possible with the fluidized bed reactor design by utilizing appropriate solid addition and withdrawal hardware.

The invention will be demonstrated in the following examples.

EXAMPLE 1

A total of 253.4 grams of Fe powder was loaded in a reactor with an inside diameter of 3.81 cm (1.5 inches). The resulting packed height was 9 cm, which yielded a packing density of 2.48 gm/cc. The reactor was made of quartz and heated with a clam shell heater.

The iron powder was produced electrolytically by SCM Metal Products, Inc. with a purity of 99.5%, the +150–325 mesh iron powder (Grade A-277) had an average particle size of approximately 100 microns. A preblended gas mixture with a nominal 1% $NF_3$ in nitrogen was used as the feed.

The iron powder bed was fluidized under a flow of nitrogen and heated to 80° C. before switching to the $NF_3$ feed. At the beginning, the feed flow started at 1,580 standard cubic centimeters (@21.1° C.) per minute (sccm) with a pressure drop across the bed (including a porous plate gas distributor) of 22 inches of water. As the reactor temperature was raised, the feed flow was reduced to maintain the pressure drop until the exit $NF_3$ was less than 10 ppm. At 240° C., almost complete conversion of $NF_3$ was observed and the feed flow was at 784 sccm.

The same experiment was repeated several times using the same batch of iron powder. At the end of the experiment, a 90% bed expansion was observed suggesting a change in solid density due to the reaction. The spent solids were analyzed by X-ray diffraction and a majority of the Fe was found to be in the form of $FeF_3$ with minor amounts of $FeF_2$ and Fe.

EXAMPLE 2

A fresh batch of 253 grams of the same type iron powder was loaded in the same reactor as described in Example 1. The iron bed was exposed to a feed containing a nominal concentration of 7% $NF_3$ in nitrogen. Following a similar experimental procedure, the exit $NF_3$ dropped to below 10 ppm when the temperature reached 300° C. Significant bed height increase was noted after the experiment.

EXAMPLE 3

Another fresh batch of 253 grams of the same type iron powder was loaded in the same reactor as described in Example 1, and the challenging feed stock contained a nominal 3 wt. % $CHF_3$. The purpose of this experiment was to check the ability to destroy other FCs, namely, $CF_4$, $C_2F_6$, $SF_6$ and $CHF_3$. Since $CHF_3$ is the most reactive chemical of the four FCs used in the electronics industry, it was chosen for the experiment.

As the reactor temperature was raised from approximately 80° C. to 534° C., no $CHF_3$ conversion was observed. The feed flow was varied in a range of 782 sccm to 1,554 sccm. No increase in bed height confirmed that no reaction took place.

The most distinguishing feature of this invention is the use of a fluidized bed reactor with small particle size metal reactant particles for efficient reactivity. The fluidized bed allows uniform temperature inside the bed and prevents plugging due to metal "sintering" or powder generation. Very significant bed expansion was unexpectedly noted after the reaction. This bed expansion would cause operating problems for a fixed bed reactor, but a fluidized bed can accommodate the bed expansion conveniently. In addition, a continuous addition and withdrawal of solids can be designed into the unit so that a continuous operation can be possible. Alternatively, several parallel connected switching beds can be used which are switched from on-line contact with the $NF_3$ containing gas to off-line regeneration depending on the achievement of either a predetermined bed height due to bed expansion or a bed weight gain, preferably at least a 90% bed height expansion or bed weight gain, respectively.

A comparison example was performed with a packed bed rather than a fluidized or percolated bed.

EXAMPLE 4

Experiments were started in which a gas stream containing 1 to 5% $NF_3$ was passed through a packed bed of iron powder at various temperatures to reactively remove the $NF_3$. Different particle sizes of iron powder were tested. The iron powder was from an electrolytic production process (SCM Metal Products, Inc.) and contained low levels of oxygen. The first test used a granular particle size (−80+20 mesh, 2.4–0.85 mm) and at 500° C. it showed complete removal of $NF_3$, but it had a low "capacity." This means that only a low percentage of the iron available reacted with the $NF_3$, and $NF_3$ breakthrough occurred quickly. The iron surface may have been "passivated" with an iron fluoride layer that caused a rapid decline in the reaction rate. A smaller particle size Fe powder (−48+325 mesh, 0.3–0.045 mm) was tested next and showed significantly higher activity with at least a 10-fold increase in capacity at 500° C. A problem with back pressure buildup required the experiment to be stopped before breakthrough occurred so complete capacity was not determined. The back pressure was caused by the formation of very fine particles of iron fluoride formed in the packed bed. The flow rates used for this example were chosen to give a 10 second residence time in the bed, and the linear velocity was 0.02 meters/sec. Temperatures below 500° C. were less effective, but still operational and avoided sintering of iron particles, thus representing a tradeoff of reactivity and particle maintenance.

Unlike the packed bed Example 4, which had poor performance, the fluidized or percolated bed examples of the present invention showed good performance and efficient utilization of the iron particle reactant. That is because the latter reactor was operated in a percolating or fluidized mode. In the reactor, the solid iron powder was percolated by the feed flow. The movement of the solids minimizes the potential of bed plugging and maintains uniform reactor temperature. Small particle size also contributes to improved performance by maximizing the capacity of the iron for reaction while minimizing the impact of iron fluoride passivation layers from forming on the iron particle and precluding further reaction and also by allowing for greater relative expansion of the particles, and therefore the bed, as the reaction proceeds.

The Fe powder can be fluidized easily at room temperature. At ambient conditions, the Fe powder bed started to fluidize at a nitrogen flow of 1,000 sccm. The minimum fluidization flow gives a minimum fluidization velocity of 1.6 cm/sec, which is reasonably close to the estimated value of 1.3 cm/sec. As temperature increases, the minimum fluidization velocity will decrease due to higher gas viscosity at higher temperatures.

At higher temperatures (>400° C.), even under nitrogen atmosphere, the Fe particles tend to agglomerate by sticking to each other. The phenomenon is known as "sintering", and it can occur at a temperature much below the melting point of the metal powder. Particle agglomeration will cause gas channeling through the bed and reduce the extent of gas-solid contact, unless a fluidized bed condition is utilized.

The temperature effect on $NF_3$ destruction was measured by raising the reactor temperature while changing the flow to keep a constant pressure across the bed. Exit $NF_3$ concentration was continuously monitored. Ten successive runs were conducted, using one charge of the Fe powder.

The uniformity of bed temperature was confirmed. A temperature profile was measured during the second run. The temperature variation inside the bed was less than 10° C.

The exit $NF_3$ concentration as a function of reactor temperature for the first, fifth, seventh and tenth run was measured. The temperature at which the exit $NF_3$ concentration started to drop was similar for all the runs (150° C.). However, a closer examination reveals that the temperature required to achieve near 100% conversion increases with successive runs.

In the second run the flowrate was varied while keeping the reactor temperature constant at 300° C. The purpose of the experiment was to explore the flow limit of the Fe powder for $NF_3$ destruction. We observed $NF_3$ breakthrough at a flow of approximately 2,000 sccm, which is equivalent to a residence time of 3 seconds.

After each run, an increase of the packed bed height was observed. The expansion was quite significant. At the beginning of the tenth run, the bed expansion was close to 90% of the original bed height.

This large bed expansion is unexpected. That is the reason why the iron powder cannot be conveniently used in a packed bed mode of operation. A fluidized bed reactor can deal with the bed expansion conveniently as long as suitable reactor volume is allocated for the anticipated expansion.

At the end of 10 runs, a total of 4,228 standard liters (@70° F.) of the feed gas was treated with the same batch (253.4 grams) of iron powder. 337 grams of the powder from the reactor were reclaimed. In addition, 3.5 grams of fine powder in various parts downstream of the reactor were collected. Compared to the original Fe loading of 253.4 grams, a weight gain of 87.1 grams or 34.4% was realized. The resulting packing density is 1.73 gm/cc. The stoichiometry of Reaction (1) suggest 253.4 grams (4.525 moles) of Fe is capable of reacting with 321 grams (109 liters @70° F.) of $NF_3$. Therefore, the 87.1 grams of weight gain (equivalent to 108.5 grams of $NF_3$) represent 33.8% of saturation, which is lower than the 42.5% utilization calculated based on total $NF_3$ treated. As can be expected, the 33.8% number is conservative and the 42.5% number is aggressive.

Minimum fluidization velocity is defined for a given particle size and density as the point at which there is a drop-off in increasing pressure drop as fluidization gas increases through a bed of the particles in question. During fluidization, there is little additional pressure drop as fluidization gas flow increases.

Although the experiments were conducted with a single bed, it is contemplated that switching beds could be used with one bed on feed, while the other beds are being recharged with fresh iron powder. Additionally, a single bed could be utilized for continuous service by utilizing a bed design where fresh iron powder is introduced through an inlet below the freeboard of the percolating or fluidized bed, and preferably near the base of the bed where the fluidizing or percolating gas is introduced, and a take-off effluent line is located above the level of the inlet, but below the level of the freeboard of the percolating or fluidized bed to remove reacted iron fluoride powder from the bed. The reacted iron fluoride is less dense than the fresh iron powder so that the effluent line would predominantly take off iron fluoride, rather than unreacted iron powder. Thus, a continuous process can be envisioned with either a single bed or two or more parallel beds.

A critical feature of the present invention is the metal powder particle size of essentially no greater than approximately 300 microns. For the purpose of the present invention, this means that up to 10 wt. % of the particles could have a larger particle size sufficient to provide enhanced mixing of the bed and to prevent caking of the smaller particles during fluidization. Particles of 500 to 2000 microns would be able to perform this function. Small particles are known to provide greater surface area, but at the cost of greater pressure drop through a bed of such smaller particles. The inventors have found that a passivating layer of metal fluoride forms on the iron particles, which deactivates them for reaction with $NF_3$. Even in the circumstance of passivation by metal fluoride, the particles of essentially no greater than approximately 300 microns would experience greater utilization than larger particles that become deactivated by passivation, leaving the relatively large interior of the large particle unreacted. Additionally, a desirable feature of the present invention is the use of bed expansion, as metal particles react to form metal fluoride, to determine on either a continuous basis or a batch basis when to replace a charge of metal particles. Small metal particles of essentially no greater than approximately 300 microns make this bed expansion property more pronounced due to their greater degree of reaction than would particles of larger size, which do not exhibit the extent of reaction, presumably due to surface passivation from metal fluoride formation.

The process of the present invention has a capacity to treat at least 700 liters of $NF_3$ per liter of iron particles. This compares favorably with U.S. Pat. No. 5,417,948 which has a capacity of 3–7 liters of $NF_3$ per liter of iron wire.

The present invention has been set forth with regard to several preferred embodiments. However the full scope of the invention should be ascertained from the claims which follow.

What is claimed is:

1. A process of destroying $NF_3$ to less than 10 ppm in a gas containing $NF_3$ and one or more gas components selected from the group consisting of $N_2$, $O_2$, $F_2$, $CF_4$, $C_2F_6$, $CHF_3$, $SF_6$ and mixtures thereof by contacting said gas at a temperature in the range of 150 to 550° C. with at least one fluidized bed of metal particles, selected from the group consisting of iron, nickel, copper, calcium, magnesium, manganese, cobalt, tin and mixtures thereof, capable of reacting with $NF_3$ wherein substantially all of said particles have a particle size no greater than 300 microns, either: (a) alternately with one of a plurality of switching parallel connected fluidized beds of metal particles and switching beds when the height of the bed being contacted with said gas increases due to bed expansion to a bed height corresponding to substantially stoichiometric reaction of $NF_3$ with said metal particles; or (b) with a single fluidized bed where said metal particles are substantially continuously being added to an inlet near a base of said fluidized bed and metal particles that have been reacted with said $NF_3$ are substantially continuously being removed above said inlet and below a freeboard of said metal particles that have been reacted with said $NF_3$ of said fluidized bed due to bed expansion.

2. The process of claim 1 wherein after said gas contacts said fluidized bed said gas contains no greater than 10 parts per million by volume of $NF_3$.

3. The process of claim 1 wherein the flow of said gas is sufficient to obtain at least a minimum fluidization velocity of the fluidized bed for said metal particles contained in said fluidized bed.

4. The process of claim 1 wherein said gas has a residence time in said fluidized bed of greater than approximately 3 seconds.

5. The process of claim 1 wherein said gas is at superatmospheric pressure.

6. The process of claim 3 wherein said flow of said gas is approximately at least two times said minimum fluidization velocity.

7. The process of claim 1 wherein said gas containing $NF_3$ contains predominately nitrogen and $NF_3$.

8. The process of claim 1 wherein said metal particles are iron.

9. The process of claim 8 wherein said iron metal particles are at least approximately 99% iron by weight.

10. The process of claim 8 wherein said iron metal particles have an average particle size of approximately 100 microns.

11. The process of claim 8 wherein said iron metal particles react with said $NF_3$ to generate $FeF_3$ and nitrogen.

12. The process of claim 8 wherein up to 10 wt. % of said bed of iron particles are large particles having a particle size sufficiently larger than 300 microns to assist in mixing of said bed of iron particles.

13. The process of claim 12 wherein said large particles have a particle size of approximately 500 to 2000 microns.

14. A process of destroying $NF_3$ to less than 10 ppm in a gas containing $NF_3$ and one or more gas components selected from the group consisting of $N_2$, $O_2$, $F_2$, $CF_4$, $C_2F_6$, $CHF_3$, $SF_6$ and mixtures thereof by contacting said gas at a temperature in the range of 150 to 550° C. with at least one fluidized bed of iron metal particles, capable of reacting with $NF_3$ wherein substantially all of said particles have a particle size no greater than 300 microns, alternately with one of a plurality of switching parallel connected fluidized beds of iron metal particles and switching beds when the height of the bed being contacted with said gas increases to a bed height corresponding to substantially stoichiometric reaction of $NF_3$ with said iron metal particles due to bed expansion.

15. A process of destroying $NF_3$ to less than 10 ppm in a gas containing $NF_3$ and one or more gas components selected from the group consisting of $N_2$, $O_2$, $F_2$, $CF_4$, $C_2F_6$, $CHF_3$, $SF_6$ and mixtures thereof by contacting said gas at a temperature in the range of 150 to 550° C. with a fluidized bed of iron metal particles, capable of reacting with $NF_3$ wherein substantially all of said particles have a particle size no greater than 300 microns, where said iron metal particles are substantially continuously being added to an inlet near a base of said fluidized bed and metal particles that have been reacted with said $NF_3$ are substantially continuously being removed above said inlet and below a freeboard of said metal particles that have been reacted with said $NF_3$ of said fluidized bed due to bed expansion.

* * * * *